Oct. 9, 1928.

M. E. BERLOWITZ 1,686,676

METHOD OF AND APPARATUS FOR TESTING MAGNETIZABLE OBJECTS

Filed April 25, 1924   3 Sheets-Sheet 1

INVENTOR
M. E. Berlowitz
BY
ATTORNEY

Oct. 9, 1928.
M. E. BERLOWITZ
1,686,676
METHOD OF AND APPARATUS FOR TESTING MAGNETIZABLE OBJECTS
Filed April 25, 1924    3 Sheets-Sheet 2
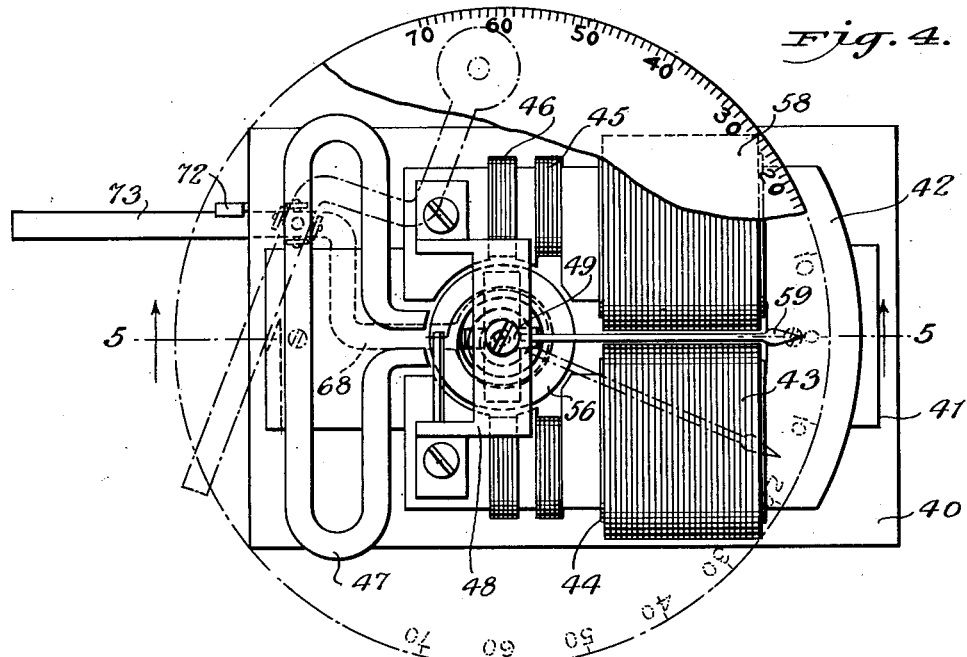
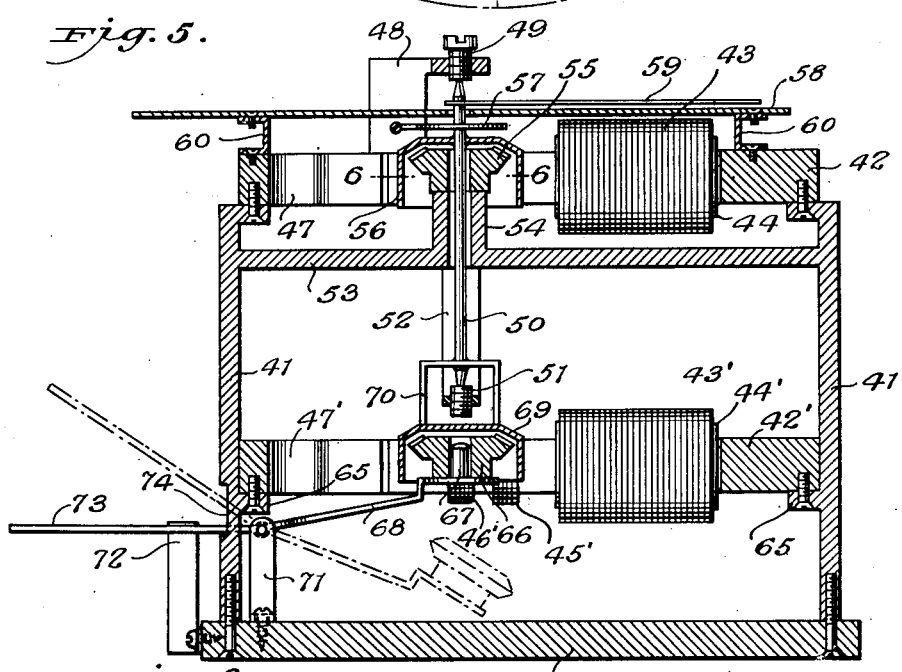
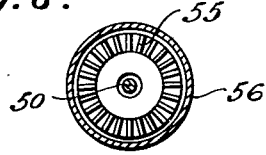
INVENTOR
M. E. Berlowitz
BY
H. Russell Bond
ATTORNEY Oct. 9, 1928.  1,686,676
M. E. BERLOWITZ
METHOD OF AND APPARATUS FOR TESTING MAGNETIZABLE OBJECTS
Filed April 25, 1924  3 Sheets-Sheet 3
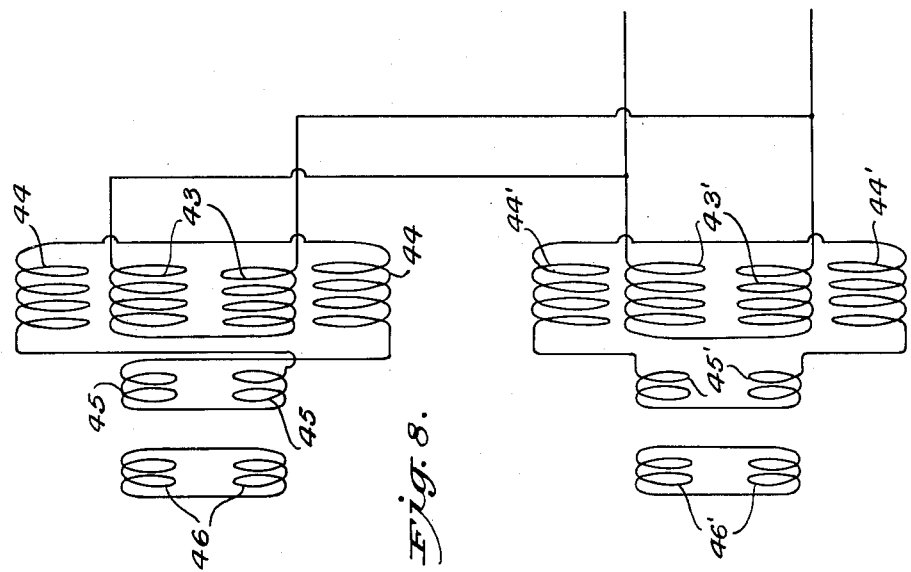
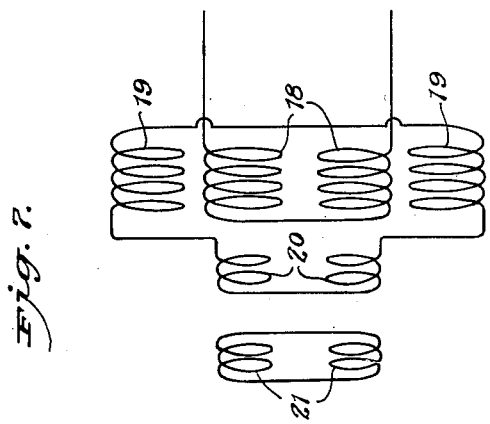
INVENTOR
M. E. Berlowitz
BY
ATTORNEY Patented Oct. 9, 1928.

1,686,676

UNITED STATES PATENT OFFICE.

MAX E. BERLOWITZ, OF BELLEVILLE, NEW JERSEY, ASSIGNOR, BY MESNE ASSIGNMENTS, TO MAGNETIC ANALYSIS CORPORATION, OF LONG ISLAND CITY, NEW YORK, A CORPORATION OF NEW YORK.

METHOD OF AND APPARATUS FOR TESTING MAGNETIZABLE OBJECTS.

Application filed April 25, 1924. Serial No. 708,885.

This invention relates to improvements in methods of and apparatus for testing magnetizable objects. It is a primary object of the invention to provide a testing apparatus of the general character disclosed in Patent No. 1,322,405, issued to Charles W. Burrows, on the 18th day of November, 1919. With my apparatus, an object to be tested is subjected to the action of a rotating magnetic field, and means are interposed between the field and the object for indicating the magnetic torque or interaction developed between the object and the field. In other words, I am able to dispense with the bodily rotation of either the field or the object, and at the same time, to secure more accurate results by rotating a very sensitive detecting device interposed between the field and the object.

It is a further object of the present invention to provide a novel apparatus for producing the rotary field.

It is still another object of the present invention to provide an apparatus by which two magnetizable objects may be directly compared as opposed to the methods of indirect comparison used by Burrows.

Further objects of the invention are to provide a novel method of testing and to provide an apparatus which will be simple and practical in construction, efficient and accurate in operation, and one which may be manufactured with comparative economy.

With these and other objects in view, the invention consists in certain novel features of construction and combinations and arrangements of parts as will be more fully hereinafter described and pointed out in the claims.

Figure 1:
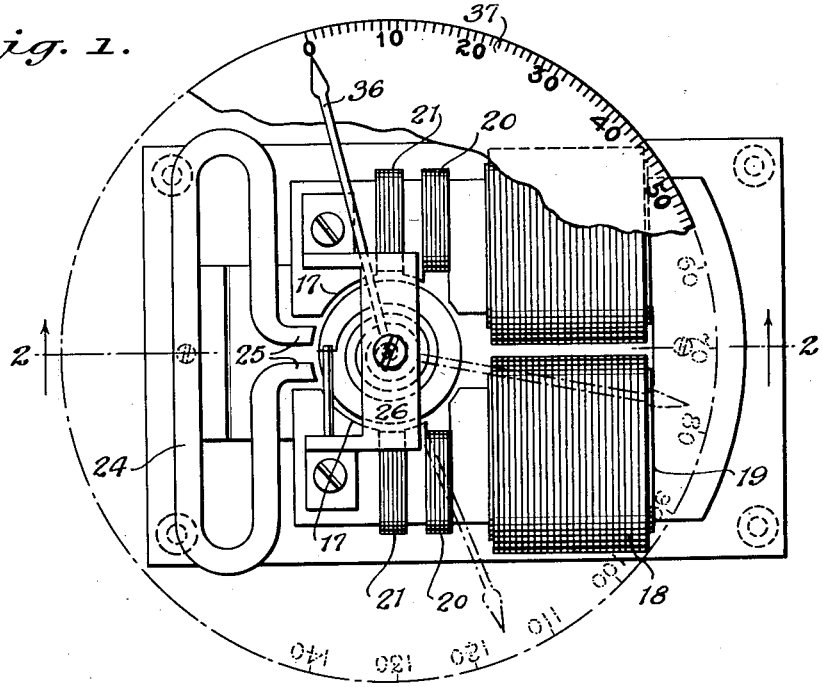
Figure 3:
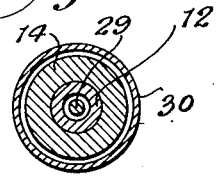
Figure 2:
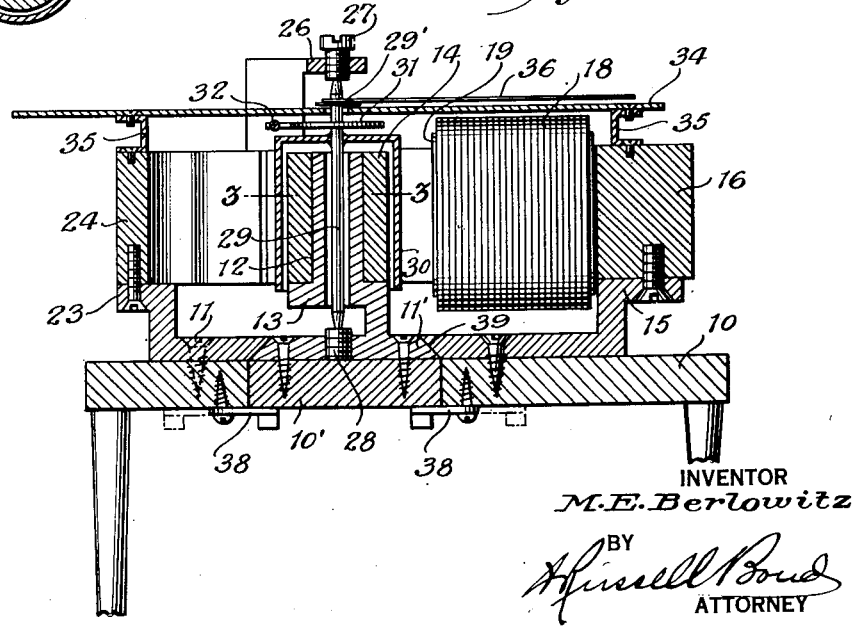

In the accompanying drawings,

Fig. 1 is a plan view of my apparatus, portions of the dial being broken away for clearness, Fig. 2 is a view in transverse section on the line 2—2 of Fig. 1, Fig. 3 is a detail sectional view on the line 3—3 of Fig. 2, Fig. 4 is a view similar to Fig. 1, but illustrating a modified form of construction for direct comparative testing, Fig. 5 is a transverse sectional view on the line 5—5 of Fig. 4, Fig. 6 is a detail sectional view on the line 6—6 of Fig. 5, Fig. 7 is a wiring diagram of the apparatus shown in Figs. 1 to 3, and Fig. 8 is a wiring diagram of the modified form of apparatus shown in Figs. 4 to 6.

Before describing in detail the apparatus utilized it may be well to roughly outline the method of testing used. This method consists in placing an object to be tested in a stationary holder, electrically rotating a magnetic field about the object to be tested, interposing a detecting means between the object and field which is sensitive to the magnetic torque developed between the object and field, yieldingly opposing the rotation of such detecting means, and utilizing indicating apparatus to indicate the extent of rotation or deflection of the detecting means.

The further development of the method also contemplates the direct comparison of a standard specimen to a specimen of unknown quality by the use of two complete and similar opposed apparatuses having a common indicating means which will indicate directly a difference in the magnetic torque developed upon the detecting means of the standard specimen and the detecting means of the specimen to be tested.

The above general statement of the method used in testing by my improved apparatus is not to be misconstrued as a statement of invention. It is merely for descriptive purposes and to clarify the following detail specification of the construction and operation of the device.

The form of the invention shown in Figs. 1 to 3 and Fig. 7 of the drawings will first be discussed. Referring to these figures, it will be noted that I have used the numeral 10 to designate a bed plate upon which I secure the flat bottom of a frame member 11, said frame member including a centrally disposed tubular specimen carrier 12 rising therefrom, and formed with an internal annular shoulder 13 adjacent its lower end. The specimen which, in this instance, consists of an annular object 14 may be frictionally fitted upon the tubular holder 12, the specimen 14 functioning in the same manner as the armature of a wattmeter, as will be more fully hereinafter described.

The frame member 11 is provided at one side with a bracket 15 upon which I support the yoke of a field core 16. As seen most clearly in Fig. 1, the legs of the core piece adjacent their extremities are cut away to provide substantially arcuate recesses 17, partly encircling the specimen on the holder 12. The legs of the core 16 are wound with the usual primary and secondary field coils 18, 19, secondary pole tip coils 20, and shading coils 21. This is conventional wattmeter construction for producing a rotary field to effect rotation of a core piece, and a detailed description of the theory of its operation need not be entered into. It is sufficient to note that when the primary field coils 18 are connected to a suitable source of alternating current, a rotary field will be produced about the specimen on the holder and magnetic torque will be developed between the field and the specimen tending to rotate the specimen on the holder or spindle 12. Such rotation is prevented by the frictional engagement of the specimen and holder or in any other suitable manner.

A second bracket 23 arranged at the opposite side of the frame 11 serves to support the conventional stationary damping magnet 24 having its pole pieces 25 arranged between the extremities of the core 16. A bracket 26 of non-magnetic material is secured upon the pole pieces of the core 16, this bracket carrying at its center a bearing 27 located directly above the opening in the tubular holder 12 and co-acting with a bearing 28 in the frame member 11 to provide a delicate mounting for a vertical rock shaft 29. Secured upon this shaft is an inverted cup-shaped member 30 of non-magnetic material, which serves to enclose and cover the specimen 14 to be tested, the member 30 being interposed between the specimen and the field producing means. The member 30 may be of aluminum, or other suitable electrically-conductive, but non-magnetic material, so that when the field producing means is energized, eddy currents will be set up in the member 30, and the magnetic inter-action developed between the field and the specimen will tend to rotate the member 30 and its supporting shaft 29. Such rotation is yieldingly opposed by a convolute spring 31, having one end secured to the rock shaft 29 and its other end secured to an anchoring pin 32 projecting inwardly from the bracket 26. In order to measure the extent to which the member 30 is turned against the action of the spring 31, I support a stationary dial 34 upon brackets 35 fixed to the pole piece 16 and magnet 24 respectively. This dial is provided with a central opening accommodating the rock shaft 29, and a finger 36 secured upon the rock shaft is readable upon calibrations 37 at the edge of the dial. A washer 29' is secured upon the rock shaft just below the finger or pointer 36.

The manner of use of the apparatus will be apparent. With a standard specimen in place, the field producing means is energized, developing magnetic torque between the field and the specimen 14, which constitutes a core. Since the specimen is held against rotation and correctly centered within the field, the only measurement of the torque developed will be indicated by the turning moment of the cup-shaped member 30, sensitive to such magnetic torque in the manner above described. The finger 36 will indicate upon the dial the torque developed with the standard specimen in place. Knowing the proper reading upon the dial for a standard specimen, a non-standard specimen may now be substituted or rather a specimen of unknown character and the movement of the indicating needle 36 will clearly show whether or not the unknown specimen varies from standard to a fatal extent. For instance, in Fig. 1, I have indicated in dotted lines the position which is assumed by the pointer 36 for a standard specimen and also for a specimen of unknown character and it will be readily apparent that there is a wide variation between the specimens.

The particular characteristics of the specimens which may be tested by the use of this invention are entirely immaterial. In prior applications of Dr. Charles W. Burrows and in his Patent No. 1,459,970, he indicates various physical properties of ferric metals which may be tested by the use of an apparatus operating upon this general principle, explaining the particular methods used for determining inhomogeneities, heat treatment, etc. My invention resides merely in the use of a novel field producing means and the use of the intermediate member 30 which makes rotary analysis possible without bodily rotating either the field or the specimen.

The importance of this feature becomes very apparent when we consider the tremendous size of some of the specimens which it is sometimes necessary to test. Such specimens may be properly centered relative to a rotating field with comparative ease, whereas the older method of either bodily rotating the specimen or bodily rotating the field while suitable for laboratory work was conducive to inaccuracies when used for ordinary commercial purposes.

It is of course necessary to provide some means for permitting the interchanging of specimens upon the tubular specimen holder 12. Having this in mind, I have made a central section 11' of the frame 11 and a subjacent section 10' of the table 10, removable as a unit. The specimen holder 12 is integral with the removable section 11' so that when this section is removed, the specimen holder and specimen and bearing 28 come with it and the weight of the rock shaft is supported upon the washer 29'. In order to secure this removable specimen holder unit in place, I employ a pair of swinging latch members 38 pivoted on the under face of the table 10 and adapted to be swung into position under section 10' of the table. Upon swinging these latch members aside, the work holding unit will gravitationally drop and a new specimen may be placed on the holder. Preferably, the section 11' of the supporting frame 11 is formed with beveled edges 39, mating with similarly beveled edges on the frame member 11, so that the frame member serves as a stop when the specimen holding unit is moved back into place.

It will be quite obvious that many expedients might be resorted to for permitting the interchanging of specimens. For instance, the cup-shaped member 30 might be arranged in inverted position so that the specimens might be dropped into place through the top of the cup. With this construction, the finger 36 instead of being fixed directly upon the rock shaft could be attached to a distant shaft suitably geared to the rock shaft and cooperating with a dial which is also located in such a position that it would not interfere with the placing of specimens in the cup. The construction shown here is a rather crude one, and merely for the purpose of illustrating some means of making interchanging of the specimens possible.

In Figs. 4 to 6 and the wiring diagram of Fig. 8, I have illustrated a modified form of construction which will permit direct comparative testing of a standard specimen with a specimen of unknown quality. With this form of apparatus, I use two similar and opposed rotating fields. The standard specimen and the specimen to be tested serve as the armatures arranged in the respective fields. A pair of intermediate non-magnetic members similar to the cup-shaped member 30 are interposed between the respective specimens and their respective fields, and are connected to a common rock shaft, turning movement of which is yieldingly opposed in both directions.

In testing, I first use two standard specimens and note the movement of the rock shaft, resulting from the opposed action of the two rotating fields on the standards. If the apparatus is properly designed, this movement should be practically negligible, or there should be no movement at all. By substituting an unknown specimen for a standard, it is a simple matter to detect a variation from standard since the rotation of the shaft with the standard and non-standard specimens in place will be in one direction or the other, since there will be a differential between the opposed torques. For practical purposes, I find it convenient to use a finger and dial and to so calibrate the dial that the finger will stand at zero when both fields are energized and two standards are in place. By thus calibrating the dial and subsequently testing with a standard and an unknown specimen in place, a variation may be quickly detected, any variation in either direction from zero being an indication of a variation from standard in the unknown specimen.

The construction of this apparatus for directly comparatively testing two specimens by the rotary analysis method is seen most clearly in Figs. 4 and 5, wherein there is shown a base 40, from which rise side frame plates 41, connected by a cross brace 53 near their upper ends. Supported upon the upper end of the frame members 41 is a field producing means similar to the field producing means described in connection with the apparatus of Figs. 1 and 3, and consisting of a core 42 similar in shape to the core 16 above described and in similar manner having wound on the legs thereof, primary and secondary field coils 43, 44, secondary phase-disturbing pole tip cores 45, and shading coils 46. A damping magnet 47 is also provided. A bracket 48 similar to the bracket 26 is mounted upon the legs of the core 42 and carries a bearing 49, providing mounting for the upper end of a rock shaft 50, the lower end of which is borne in a bearing 51, secured in a hanger 52 depending from the cross brace 53 within the frame 41. The cross brace 53 is formed with a tubular post 54 through which the rock shaft 50 extends. A standard specimen 55 is permanently secured upon the post 54 and a non-magnetic cup-shaped detecting member 56 similar to the member 31 is secured upon the rock shaft and embraces the standard specimen 55. Turning movement of the rock shaft in either direction is opposed by a convolute balance spring 57 and movement of the shaft may be measured upon a dial 58 by means of a finger 59 secured to the shaft. The dial 58 is supported upon brackets 60 carried by the core 42 and damping magnet 47 respectively. Near the lower end of the cylindrical frame 41, enclosed within the frame, and supported upon shoulders 65 within the frame, there is a second field producing means, consisting of a core 42', primary and secondary windings 43', 44', secondary pole tip coils 45' and shading coils 46'. A damping magnet 47' is also used. This means is identical with the means for producing the field about the standard specimen 55 and with the means previously described in connection with Figs. 1 and 3 of the drawings, but it will be noted that the secondary pole tip coils 45, 45' are connected in opposition (Fig. 8). A specimen to be tested 66 is supported upon a specimen carrier 67 arranged at the free end of a lever 68. A second inverted cup-shaped non-magnetic detecting member 69 depends from a hanger 70 secured to the rock shaft 50 near its lower end, and is adapted to surround and enclose the specimen 66. The lever 68 is fulcrumed intermediate its ends within a bracket 71, and for holding the lever in the substantially horizontal position necessary to present specimen 66 in proper position for testing, I use a spring keeper 72 secured to the base member 40 exteriorly of the frame 41 and adapted for engagement with the handle end 73 of the lever which projects through a suitable slot 74 in one end frame 41. For convenience in changing specimens, I prefer to swivel the bracket 71, wherein the lever 68 is mounted, so that the lever may not only be tilted to the dotted line position shown in Fig. 5, but may be swung laterally to the dotted line position indicated in Fig. 4, presenting the specimen holder in convenient position so that an operator may rapidly interchange specimens thereon.

I have shown a pair of beveled gears as specimens in this instance, but it will be readily apparent that any annular object might be tested by use of the apparatus. The manner of use is as follows: A standard specimen is permanently secured in place upon the holder 54. This standard may be placed on the holder as the apparatus is assembled. In order to properly calibrate the dial 58, a second standard is placed upon the specimen holder 67, this specimen holder being swung downwardly and laterally as above described to permit the specimen to be placed thereupon. The field producing means for both of the specimens are identical and when they are energized, similar opposed magnetic torque will be developed between each field and its specimen. This torque in turn will be imparted to the cup-shaped members 56 and 69 which will tend to turn the shaft 50, and consequently the finger 59. This turning movement is yieldingly opposed by the spring 57 as above noted. If the apparatus is accurate, no movement will be imparted to the shaft and the dial may be calibrated at zero for the normal position of the balance spring. Having determined the zero point on the dial, the dial may be graduated in both directions. If the operation is repeated with a non-standard specimen substituted for the standard in the holder 67, the needle will come to rest at some position other than zero and an accurate indication may be had of the variation above or below standard of the non-standard specimen. It is to be noted that the movement of the pointer 59 with this type of apparatus is the result of the differential torques developed between the two fields and the two specimens, to which torques the detecting members 56 and 69 are sensitive. If the non-standard specimen is of a character to develop greater torque or magnetic interaction between itself and its field than a standard specimen, the needle will be swung to one side of zero, or if it is of material which is less sensitive to the action of the rotating field, the needle will come to rest at the other side of zero. Variations of specimens both above and below standard may thus be noted and the exact extent of such variations.

Similarly to the apparatus disclosed in Figs. 1 and 3, the apparatus of Figs. 4 and 5 may be used for testing magnetizable metals for the determination or comparison of a number of physical characteristics, all of which have been discussed at some length in previous applications of Dr. Charles W. Burrows, as well as the methods of distinguishing between the different characteristics by use of apparatus of this general character.

The particular characteristic of the magnetic specimen which is to be tested is entirely immaterial to and forms no part of the present invention. The wiring diagrams of Figs. 7 and 8 show nothing more than ordinary wattmeter field core windings, the diagram of Fig. 8 showing two such field core windings, the primaries of which are connected in series and the secondary pole tip core in opposition as above noted to reverse the direction of rotation of the two similar rotating fields.

It will be noted that in both types of apparatus, either for indirect or direct comparative testing, I use the intermediate non-magnetic member sensitive to the magnetic torque developed between the specimen and field, and thereby eliminate the necesssity of bodily rotating either specimen or field.

With the type of apparatus just described, it should be apparent that the torque of the magnetic interaction developed between the respective specimens and fields might be added instead of opposed, and fairly accurate readings obtained. The method of interchanging specimens shown in this apparatus is also rather crude and a more refined apparatus will be provided with accurate means for centering the specimens relative to the respective fields and for preventing rotation of the specimens on their supports.

Various changes and alterations might be made in the general form and arrangement of the parts described without departing from the invention, and hence I do not wish to limit myself to the precise details set forth, but shall consider myself at liberty to make such changes and alterations as fairly fall within the spirit and scope of the appended claims.

I claim:

1. A method of directly comparatively testing a magnetizable object which consists in placing such object and a standard object in similar rotating magnetic fields, placing in the respective fields similar means sensitive to the magnetic torque developed between the respective objects and fields, and comparing the effects produced by such torque upon the respective sensitive means.

2. A method of directly comparatively testing a magnetizable object to a standard, which consists in placing the standard object and the object to be tested within similar rotating magnetic fields, placing separate rotary means in the fields sensitive to the magnetic torque developed between the respective objects and fields, and comparing the movement of said means developed by such torque.

3. Apparatus for testing magnetizable objects, comprising means for producing a pair of similar rotating magnetic fields, means for supporting a standard specimen in one field and a non-standard specimen in the other field, movable detecting means in the respective fields sensitive to the magnetic torque developed between the fields and the respective specimens, the movement of one detecting means being in opposition to the movement of the other detecting means.

4. Apparatus for testing magnetizable objects, comprising means for producing a pair of similar oppositely rotating magnetic fields, means for supporting a standard and a non-standard specimen in the respective fields, means sensitive to the magnetic torque developed between the respective specimens and fields, said means comprising non-magnetic detecting devices mounted upon a common shaft.

5. Apparatus for testing magnetizable objects, comprising means for producing a pair of similar oppositely rotating magnetic fields, means for supporting a standard and a non-standard specimen in the respective fields, means sensitive to the magnetic torque developed between the respective specimens and fields, said means comprising non-magnetic detecting devices mounted upon a common shaft, and means for indicating the movement of the shaft caused by differential torques developed between the respective fields and specimens.

MAX E. BERLOWITZ.